US005681890A

United States Patent [19]
Tanaka et al.

[11] Patent Number: 5,681,890
[45] Date of Patent: Oct. 28, 1997

[54] HIGHLY STAIN-RESISTANT FILM-FORMING COATING COMPOSITION

[75] Inventors: Shoichi Tanaka; Takashi Nakano, both of Hiratsuka, Japan

[73] Assignee: Kansai Paint Co., Ltd., Amagasaki, Japan

[21] Appl. No.: 611,189

[22] Filed: Mar. 5, 1996

[30] Foreign Application Priority Data

Mar. 9, 1995 [JP] Japan .................................. 7-049456
Mar. 9, 1995 [JP] Japan .................................. 7-049478

[51] Int. Cl.$^6$ ..................................................... C08L 51/00
[52] U.S. Cl. .......................... 524/539; 524/114; 524/262; 524/265
[58] Field of Search ................................... 524/539, 114, 524/262, 265

[56] References Cited

FOREIGN PATENT DOCUMENTS

370172/92   12/1992   Japan .

Primary Examiner—Edward J. Cain
Attorney, Agent, or Firm—Fisher, Christen & Sabol

[57] ABSTRACT

A coating composition containing 100 parts by weight of a resin composition consisting of 30 to 90 parts by weight of (A) a hydroxyl group-containing polyester resin and 10 to 70 parts by weight of (B) a melamine resin curing agent selected from the group consisting of a mixture of methyl etherified melamine resin with butyl etherified melamine resin and a melamine resin having three or more on an average of methyl etherified methylol group per one of triazine nucleus and having a number average molecular weight of 1,000 or less; 0.2 to 3.0 parts by weight, calculated in terms of an amount of a sulfonic acid compound, of (C) a curing catalyst consisting of a neutralized product between the sulfonic acid compound and an amine; and 1 to 20 parts by weight of (D) a silicone compound mainly consisting of polydimethylsiloxane chain and having at least one selected from hydroxyl group, carboxyl group, epoxy group and mercapto group as a functional group.

18 Claims, No Drawings

HIGHLY STAIN-RESISTANT FILM-FORMING COATING COMPOSITION

BACKGROUND OF THE INVENTION

(1) Field of the Invention

The present invention relates to a coating composition which is capable of forming a film having high impact resistance and stain resistance, particularly such a high stain resistance as to make it possible to easily remove oil ink, oil adhered after having been evaporated, etc. by wiping off, and which has good coating workability, and relates to a coating composition particularly suitable for a coated steel sheet for use in fabrication of utensils.

(2) Description of the Prior Art

As a top coating composition for use in a coated steel sheet to be fabricated in the form of utensils, for example, kitchen utensils such as refrigerator, range hood, ventilation fan, gas table and the like, there has been known in the art an organic solvent type coating composition or powder coating composition, which contains, as a resin component, a composition comprising polyester resin as a base resin, and a melamine resin or isocyanate compound curing agent. Of these, a coating composition comprising a mixture of polyester resin with melamine resin, particularly methyl etherified methylol melamine resin, and a curing catalyst, has widely been used.

Previously, removal of evaporated and adhered oil pollutants in the kitchen utensils such as a range hood, gas table and the like had required a great deal of labor. In recent years, for the purpose of saving the above labor, there have been demanded such kitchen utensils as to make it possible to easily wipe off and remove the adhered oil pollutants with a tissue paper or the like.

The present inventors proposed in Japanese Patent Application Laid-Open No. 370172/92 a coating composition prepared by adding a large amount of curing catalyst to a resin combination of a specified polyester resin and a large excess of melamine resin, as a top coating composition to improve stain resistance. However, a film formed from the above coating composition was such that it was possible to remove the adhered oil ink and oil pollutants by rubbing off with a cloth impregnated with a solvent such as ethanol or the like, but it was impossible to easily remove them by wiping off with a tissue paper.

SUMMARY OF THE INVENTION

It is an object of the present invention to provide a coating composition capable of forming a film to make it possible to easily wipe off and remove the adhered oil ink and oil pollutants with a tissue paper or the like.

It is another object of the present invention to provide a coating composition capable of forming a film having high stain resistance and impact resistance, and suitable for a top coating composition for use in a coated steel sheet used in fabrication of utensils such as a range hood, ventilation fan, gas table and the like, for which high stain resistance is required.

It is another object of the present invention to provide a coating composition capable of forming a film having excellent properties in fabricating properties, film hardness and solvent resistance in addition to impact resistance and stain resistance by selecting respective kinds and amounts of respective components thereof.

That is, the present invention firstly provides a coating composition containing 100 parts by weight of a resin composition consisting of 30 to 90 parts by weight of (A) a hydroxyl group-containing polyester resin and 10 to 70 parts by weight of (B) a melamine resin curing agent consisting of a mixture of methyl etherified melamine resin with butyl etherified melamine resin; 0.2 to 3.0 parts by weight, calculated in terms of an amount of a sulfonic acid compound, of (C) a curing catalyst consisting of a neutralized product between the sulfonic acid compound and an amine; and 1 to 20 parts by weight of (D) a silicone compound represented by the following general formula:

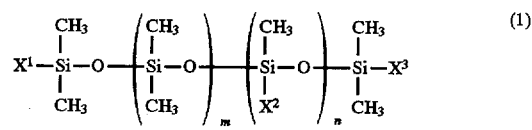

where $X^1$, $X^2$ and $X^3$ represent methyl group or a $C_1$–$C_8$ organic group having at least one functional group selected from the group consisting of hydroxyl group, carboxyl group, epoxy group and mercapto group, provided at least one of $X^1$, $X^2$ and $X^3$ is a $C_1$–$C_8$ organic group having at least one functional group selected from the group consisting of hydroxyl group, carboxyl group, epoxy group and mercapto group, m is an integer of 10 to 300, n is an integer of 0 to 290, a total of m and n is in the range of 10 to 300, an orientation order of repeating units:

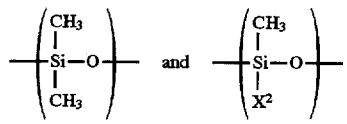

may be in the form of a random orientation or block orientation (hereinafter may be referred to as a first invention).

The present invention secondly provides a coating composition containing 100 parts by weight of a resin composition consisting of 30 to 90 parts by weight of (A) a hydroxyl group-containing polyester resin and 10 to 70 parts by weight of (B) a melamine resin curing agent consisting of a melamine resin having three or more on an average of methyl etherified methylol group per one of triazine nucleus and having a number average molecular weight of 1,000 or less; 0.2 to 3.0 parts by weight, calculated in terms of an amount of a sulfonic acid compound, of (C) a curing catalyst consisting of a neutralized product between the sulfonic acid compound and an amine; and 1 to 20 parts by weight of (D) a silicone compound represented by the following general formula:

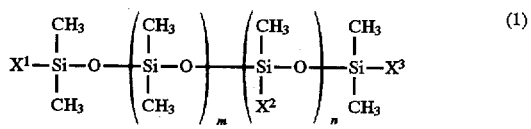

where $X^1$, $X^2$ and $X^3$ represent methyl group or a $C_1$–$C_8$ organic group having at least one functional group selected from the group consisting of hydroxyl group, carboxyl group, epoxy group and mercapto group, provided at least one of $X^1$, $X^2$ and $X^3$ is a $C_1$–$C_8$ organic group having at least one functional group selected from the group consisting of hydroxyl group, carboxyl group, epoxy group and mercapto group, m is an integer of 10 to 300, n is an integer of 0 to 290, a total of m and n is in the range of 10 to 300, an orientation order of repeating units:

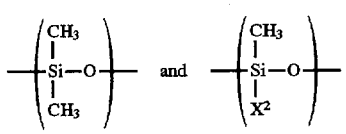

may be in the form of a random orientation or block orientation (hereinafter may be referred to as a second invention).

In a preferred embodiment, the first invention provides a coating composition, wherein the methyl etherified melamine resin in the melamine resin curing agent (B) is a methyl etherified melamine resin having three or more on an average of methyl etherified methylol group per one of triazine nucleus and having a number average molecular weight of 1,000 or less.

In a preferred embodiment, the first invention provides a coating composition which contains 100 parts by weight of a resin composition consisting of 60 to 85 parts by weight of the hydroxyl group-containing polyester resin (A) having a number average molecular weight of 4,000 to 30,000;, a glass transition temperature of −5° C. to 35° C. and a hydroxyl number of 3 to 25 mg KOH/g, and 15 to 40 parts by weight of the melamine resin curing agent (B) having a methyl etherified melamine resin/butyl etherified melamine resin solid content weight ratio of 85/15 to 30/70; 0.3 to 2.0 parts by weight, calculated in terms of an amount of the sulfonic acid compound, of the curing catalyst (C) consisting of at least one selected from the group consisting of a neutralized product between p-toluenesulfonic acid and an amine, and a neutralized product between dodecylbenzene sulfonic acid and an amine; and 1 to 20 parts by weight of the silicone compound (D).

In a preferred embodiment, the second invention provides a coating composition which contains 100 parts by weight of a resin composition consisting of 60 to 85 parts by weight of the hydroxyl group-containing polyester resin (A) having a number average molecular weight of 4,000 to 30,000, a glass transition temperature of −5° C. to 35° C. and a hydroxyl number of 3 to 25 mg KOH/g; and 15 to 40 parts by weight of the melamine resin curing agent (B); 0.3 to 2.0 parts by weight, calculated in terms of an amount of the sulfonic acid compound, of the curing catalyst (C) consisting of at least one selected from the group consisting of a neutralized product between p-toluenesulfonic acid and an amine, and a neutralized product between dodecylbenzene sulfonic acid and an amine; and 1 to 20 parts by weight of the silicone compound (D).

The present invention thirdly provides a highly stain-resistant coated metal sheet prepared by forming a cured film from a coating composition of the present invention directly or through a primer coat onto a metal sheet (hereinafter may be referred to as a third invention).

DETAILED DESCRIPTION OF THE INVENTION

The polyester resin (A) in the coating composition of the present invention is a hydroxyl group-containing polyester resin, and may include oil-free polyester resin, oil-modified alkyd resin, and modified products of these resins, for example, urethane-modified polyester resin, urethane-modified alkyd resin and the like.

The above polyester resin (A) preferably has a number average molecular weight of 1,000 to 35,000, a glass transition temperature of −10° C. to 80° C. and a hydroxyl number of 3 to 160 mg KOH/g, more preferably a number average molecular weight of 4,000 to 30,000, a glass transition temperature of −5° C. to 35° C. and a hydroxyl number of 3 to 25 mg KOH/g from the standpoints of fabricating properties, film hardness, solvent resistance and stain resistance of a film obtained therefrom, as well as easiness of handling of the resin. In the present invention, the glass transition temperature (Tg) represents a value measured by a differential thermal analysis (DSC) and the number average molecular weight represents a value measured by use of a calibration curve of a standard polystyrene in accordance with a gel permeation chromatography (GPC).

The glass transition temperature of the polyester resin is preferably 30° C. or lower in the case of giving priority to fabricating properties, and preferably 15° C. or higher in the case of giving priority to film hardness.

The oil-free polyester resin is mainly an esterified product between a polybasic acid and polyhydric alcohol. Examples of the polybasic acid may include at least one dibasic acid selected from phthalic anhydride, isophthalic acid, terephthalic acid, succinic acid, adipic acid, fumaric acid, maleic anhydride, tetrahydrophthalic anhydride, hexahydrophthalic anhydride and the like; lower alkyl esterified products of the above acids, if needed, monobasic acid such as benzoic acid, crotonic acid, p-tert-butyl benzoic acid and the like, and trivalent or higher polybasic acid such as trimellitic anhydride, methylcyclohexene tricarboxylic acid, pyromellitic anhydride and the like. Examples of polyhydric alcohol may include mainly dihydric alcohol such as ethylene glycol, propylene glycol, diethylene glycol, butanediol, neopentyl glycol, 3-methylpentanediol, 1,4-hexanediol, 1,6-hexanediol and the like; if needed, combinations thereof with trihydric or higher polyhydric alcohol such as glycerin, trimethylolethane, trimethylolpropane, pentaerythritol and the like. Esterification reaction or ester exchange reaction between the above both components may be carried out by the conventional process. Of the above acid components, terephthalic acid, isophthalic acid and lower alkyl esterified products of these acids are particularly preferred.

The alkyd resin is one obtained by reacting oil fatty acid along with both acid component and alcohol component of the above oil-free polyester resin according to a known process. Examples of the oil fatty acid may include coconut oil fatty acid, soybean oil fatty acid, linseed oil fatty acid, safflower oil fatty acid, tall oil fatty acid, dehydrated castor oil fatty acid, tung oil fatty acid and the like. An oil length of the alkyd resin is preferably 30% or less.

The urethane-modified polyester resin is one obtained by reacting the above oil-free polyester resin or a lower molecular weight oil-free polyester resin obtained by reacting both acid component and alcohol component on preparing the above oil-free polyester resin with a polyisocyanate compound according to a known process. The urethane-modified alkyd resin is one obtained by reacting the above alkyd resin or a lower molecular weight alkyd resin obtained by reacting respective components on preparing the above alkyd resin with a polyisocyanate compound according to a known process. Examples of the polyisocyanate compound used in the preparation of the urethane-modified polyester resin and urethane-modified alkyd resin may include hexamethylene diisocyanate, isophorone diisocyanate, xylylene diisocyanate, tolylene diisocyanate, 4,4'-diphenylmethane diisocyanate, 4,4'-methylene bis (cyclohexyl-isocyanate), 2,4,6-triisocyanatotoluene and the like.

The melamine resin curing agent (B) in the coating composition of the first invention is a mixture of methyl etherified melamine resin with butyl etherified melamine resin.

The melamine resin curing agent (B) in the coating composition of the second invention is a melamine resin having three or more on an average of a methyl etherified methylol group per one of triazine nucleus and having a number average molecular weight of 1,000 or less. It is necessary from the standpoints of compatibility with polyester resin (A), the stain resistance, fabricating properties, etc. of a film formed therefrom to satisfy the above requirements.

The methyl etherified melamine resin in the melamine resin curing agent (B) of the first invention or as the melamine resin curing agent (B) of the second invention may include methyl etherified melamine resin obtained by etherifying a part or all of methylol groups in methylol melamine resin as an adduct (monomer or oligomer) of melamine with formaldehyde with methanol only; and a melamine resin obtained by mixed-etherifying a part or all of methylol groups in the methylol melamine resin with a mixed alcohol of methanol with $C_{2-4}$ alcohols such as ethanol, isopropanol, n-butanol, isobutanol and the like.

The methyl etherified melamine resin used in the melamine resin curing agent (B) of the first invention is preferably a methyl etherified melamine resin having three or more on an average of methyl etherified methylol group per one of triazine nucleus and having a number average molecular weight of 1,000 or less from the standpoints of compatibility with polyester resin (A), the stain resistance, fabricating properties, etc. of a film formed therefrom.

Examples of commercially available ones of preferable methyl etherified melamine resin used in the melamine resin curing agent (B) of the first invention and of the melamine resin curing agent (B) of the second invention may include methyl etherified melamine resins such as CYMEL 303, CYMEL 325, CYMEL 327, CYMEL 350, CYMEL 730, CYMEL 736, CYMEL 738 (all marketed by Mitsui Cytec Co., Ltd., trade name), MELAN 522, MELAN 523 (both marketed by Hitachi Chemical Co., Ltd., trade names), NIKALAC MS001, NIKALAC MX650 (both marketed by Sanwa Chemical Co., Ltd., trade names) and SUMIMAL M-55 (marketed by Sumitomo Chemical Co., Ltd., trade name) methyl ether and butyl ether mixed etherified melamine resins such as CYMEL 232, CYMEL 266, CYMEL XV-514 (all marketed by Mitsui Cytec Co., Ltd., trade names), NIKALAC MX500, NIKALAC MX600, NIKALAC MS95 (all marketed by Sanwa Chemical Co., Ltd., trade names), RESIMENE 753, RESIMENE 755 (both marketed by Monsanto Co., Ltd., trade names), and the like.

The butyl etherified melamine resin mixed and used with the above methyl etherified melamine resin in the melamine resin curing agent (B) of the first invention may be obtained by etherifying a part or all of methylol groups in methylol melamine as an adduct (monomer or oligomer) of melamine with formaldehyde, and preferably has a number average molecular weight of 800 to 8,000, more preferably 1,000 to 3,000 from the standpoints of stability of a coating composition obtained therefrom and stain resistance of a film obtained therefrom.

Examples of commercially available ones of the preferable butyl etherified melamine resin may include U-VAN 20SE, U-VAN 28SE (both marketed by Mitsui Toatsu Chemicals Inc., trade names), SUPER BECKAMINE J-820-60, Ditto L-117-60, Ditto L-109-65, Ditto G-821-60, Ditto 47-508-60, Ditto L-118-60 (all marketed by Dainippon Ink & Chemicals Inc., trade names) and the like.

A combined use of methyl etherified melamine resin with butyl etherified melamine resin causes the butyl etherified melamine resin having poor compatibility with polyester resin to migrate toward a film surface, resulting in that a cured film shows high stain resistance and advantage in film hardness, and shows advantage in fabricating properties of the film, because crosslinking in an interior of the film may be carried out mainly by methyl etherified melamine resin.

The curing catalyst (C) in the coating composition of the present invention is a neutralized product between a sulfonic acid compound and an amine, and is a catalyst for promoting a curing reaction between the polyester resin (A) and the melamine resin curing agent (B).

The sulfonic acid compound may include strong acid-sulfonic acid compounds such as p-toluene sulfonic acid, dodecylbenzene sulfonic acid, dinonylnaphthalene sulfonic acid, dinonylnaphthalene disulfonic acid, and the like. Of these sulfonic acid compounds, at least one of p-toluene sulfonic acid and dodecylbenzene sulfonic acid is preferred.

The amine used for neutralizing the sulfonic acid compound may include any amine which is capable of neutralizing the sulfonic acid compound and may evaporate on heat outing, and may include a primary amine, secondary amine and tertiary amine. Of these, the secondary amine is preferred, because the use of the primary amine may result coloring of the film and the use of the tertiary amine may result in developing shrinkages or fine uneven patterns on the surface of the film.

Typical examples of the preferable secondary amine may include diethylamine, diisopropylamine, di-n-propylamine, di-n-butylamine, diisobutylamine, di-sec-butylamine, diallylamine, diamylamine, N-ethyl-1,2-dimethylpropylamine, N-methylhexylamine, di-n-octylamine, piperidine, 2-pipecoline, 3-pipecoline, 4-pipecoline, morpholine, 2,4-lupetidine, 2,6-lupetidine, 3,5-lupetidine, dimethyloxazolidine, 3-piperidine methanol, and the like. Of these, dimethyloxazolidine, morpholine and dialkylamine, particularly diisopropyl amine, di-n-propylamine, di-n-butylamine and disobutylamine are preferred from the standpoints of a lower level of smell and stain resistance of a film obtained therefrom.

A neutralization equivalent of sulfonic acid compound with amine is such that an amount of the neutralizing amine is preferably 0.2 to 1.1 equivalents, more preferably 0.5 to 1.0 equivalent per one equivalent of sulfonic acid group. When the sulfonic acid compound is not neutralized with amine, a resulting film shows poor stain resistance, and, on the other hand, when the neutral equivalent is in an excess, shrinkages may develop on the surface of a resulting film. On formulating the curing catalyst to prepare a coating composition, a curing catalyst, which is neutralized with amine in advance, may be used, or the sulfonic acid compound and amine may be separately formulated to form a neutralized product between the sulfonic acid compound and amine in a coating composition.

The silicone compound (D) in the coating composition of the present invention is formulated to improve stain resistance of a resulting film, and may include ones represented by the above general formula [1].

The $C_1$–$C_8$ organic group having at least one functional group selected from the group consisting of hydroxyl group, carboxyl group, epoxy group and mercapto group as represented by $X^1$, $X^2$ and $X^3$ in the above general formula [1] may include, for example, aliphatic, alicyclic or aromatic hydrocarbon group such as alkyl group, cycloalkyl group, cycloalkylalkyl group, aryl group, aralkyl group and the like, substituted with the above functional groups respectively.

Specific examples of the organic group substituted with the above functional groups may include hydroxyl group-containing organic groups such as hydroxymethyl, hydroxyethyl, hydroxybutyl, hydroxypentyl, hydroxyhexyl, hydroxyoctyl, hydroxycyclohexyl, (hydroxymethyl) cyclohexyl, hydroxyphenyl, (hydroxymethyl)phenyl and the like; carboxyl group-containing organic groups such as carboxymethyl, carboxyethyl, carboxybutyl, carboxypentyl, carboxyhexyl, carboxyoctyl, carboxycyclohexyl, carboxyphenyl and the like; epoxy group-containing organic groups such as glycidyl, 3,4-epoxybutyl, 3,4-epoxycyclohexyl and the like; mercapto group-containing organic groups such as mercaptomethyl, mercaptoethyl, mercaptobutyl, mercaptopentyl, mercaptohexyl, mercaptooctyl and the like.

In the silicone compound (D) represented by the above general formula [1], when m is less than 10, the resulting film shows unsatisfactory stain resistance, and, on the other hand, when m is more than 300, compatibility with the polyester resin (A) is reduced, resulting in reducing stability of the coating composition. When a total amount of m and n is less than 10, film defects such as cissing may develop on a film on coating the coating composition, the silicone compound may evaporate on heat curing the film, and the film may show unsatisfactory stain resistance. On the other hand, when a total amount of m and n is more than 300, compatibility with the polyester resin (A) may be reduced, resulting in reducing stability of the coating composition.

The above silicone compound (D) has the functional group and may react with polyester resin (A) and the melamine resin curing agent (B) without disappearing out of the film with time, and mainly consists of methylpolysiloxane moiety and has a low surface tension, resulting in that a film surface shows high stain resistance for a long period of time.

A mixing ratio of the polyester resin (A) to the melamine resin curing agent (B) in the coating composition of the present invention is such that (A)/(B) as a solid content weight ratio is in the range of 30/70 to 90/10, preferably 60/40 to 85/15. When an amount of the component (A) per 100 parts by weight of a total of the component (A) and the component (B) is less than 30 parts by weight, impact resistance of the film may extremely be reduced and cracks may develop on the film. On the other hand, when more than 90 parts by weight, the resulting film may show poor properties in stain resistance, hardness, solvent resistance and the like.

A mixed amount of the neutralized product between the sulfonic acid compound and amine as the curing catalyst in the coating composition of the present invention is in the range of 0.2 to 3.0 parts by weight, preferably 0.3 to 2.0 parts by weight, calculated in terms of an amount of a sulfonic acid compound, per 100 parts by weight as a total amount of the polyester resin (A) and the melamine resin curing agent (B). When less than 0.2 part by weight, the resulting film shows unsatisfactory stain resistance. On the other hand, when more than 3.0 parts by weight, the resulting film shows poor impact resistance.

A mixed amount of the silicone compound (D) in the coating composition of the present invention is in the range of 1 to 20 parts by weight, preferably 2 to 10 parts by weight per 100 parts by weight of a total amount of the polyester resin (A) and melamine resin curing agent (B). When the amount of the silicone compound (D) is less than one part by weight, the resulting film shows unsatisfactory stain resistance. On the other hand, more than 20 parts by weight, compatibility with the polyester resin (A) is reduced, resulting in reducing stability of the coating composition.

The coating composition of the present invention may consist of the components (A), (B), (C) and (D), but may usually contain an organic solvent from the standpoints of handling, coating application properties, etc. The organic solvent may include any organic solvents capable of dissolving or dispersing respective components (A), (B), (C) and (D), and specifically may include ketone solvent such as methyl isobutyl ketone, cyclohexanone, isophorone and the like; hydrocarbon solvent such as toluene, xylene, high boiling point petroleum hydrocarbon and the like; ether solvent such as ehtylene glycol monoethyl ether, ethylene glycol monobutyl ether, diethylene glycol monobutyl ether, and the like; ester solvent such as ethyl acetate, butyl acetate, ethylene glycol monoethyl ether acetate, diethylene glycol monoethyl ether acetate, and the like; and the like. These solvents may be used alone or in combination.

The coating composition of the present invention may be used as a pigment-free clear coating composition, but may also be used as a color pigment-containing enamel coating composition, too. The color pigment may include any color pigments usable in the field of the coating composition, for example, organic color pigments such as Cyanine Blue, Cyanine Green, organic red pigments of azo series and quinacridone series and the like; and inorganic color pigments such as titanium white, titanium yellow, red iron oxide, carbon black, chrome yellow, various kinds of calcined pigments and the like. The coating composition of the present invention may also contain, if needed, extender pigments such as talc, clay, silica, mica, alumina and the like, fillers, additives, high molecular weight organic polymer powder, and the like.

A substrate to coat the coating composition of the present invention may preferably include metal sheets such as cold-rolled steel sheet, zink hot dipped steel sheet, zinc hot dipped steel sheet, alloy-plated steel sheet, aluminum sheet, stainless steel sheet, copper sheet, copper-plated steel sheet, tin-plated steel sheet and the like, and surface-treated metal sheets prepared by subjecting the above metal sheets to a surface treatment with a surface treating agent such as phosphate, chromate or the like, but may also contain plastics, wood, cement, etc. The above coating composition may be coated directly or through a primer coating onto the substrate. Examples of the primer may include epoxy resin primers, polyester primers, acrylic resin primers, modified primers thereof, and the like. Of these, polyester primers are particularly preferred from the standpoint of fabricating properties.

A coating method of the coating composition of the present invention may include curtain flow coating, roller coating, dip coating, spray coating, etc., and coating is usually carried out so that a dry film thickness may be in the range of 5 to 30 μm. The curing conditions of the above coating composition may be selected as required from conditions of curing temperature and curing time, but coating in the field of a precoating to coat by a coil coating or the like, may preferably be carried out under the conditions of an ultimate maximum substrate temperature of 160° to 260° C. and a curing time of 15 to 90 sec., particularly 200° to 230° C. and 30 to 70 sec.

The coating composition of the first invention is capable of forming a film having high impact resistance and stain resistance, but, to be a coating composition capable of forming a film having excellent properties in fabricating properties, film hardness and solvent resistance in addition to high impact resistance and stain resistance, is preferably a coating composition which contains 100 parts by weight of a resin composition consisting of 60 to 85 parts by weight of the hydroxyl group-containing polyester resin (A) having a number average molecular weight of 4,000 to 30,000, a glass transition temperature of −5° C. to 35° C. and a hydroxyl number of 3 to 25 mg KOH/g, and 15 to 40 parts by weight of the melamine resin curing agent (B) having a methyl etherified melamine resin/butyl etherified melamine resin solid content weight ratio of 85/15 to 30/70; 0.3 to 2.0 parts by weight, calculated in terms of an amount of the sulfonic acid compound, of the curing catalyst (C) consisting of at least one selected from the group consisting of a neutralized product between p-toluenesulfonic acid and an amine, and a neutralized product between dodecylbenzene sulfonic acid and an amine; and 1 to 20 parts by weight of the silicone compound (D).

The coating composition of the second invention is capable of forming a film having high impact resistance and stain resistance, but, to be a coating composition capable of forming a film having excellent properties in fabricating properties, film hardness and solvent resistance in addition to high impact resistance and stain resistance, is preferably a coating composition which contains 100 parts by weight of a resin composition consisting of 60 to 85 parts by weight of the hydroxyl group-containing polyester resin (A) having a number average molecular weight of 4,000 to 30,000, a glass transition temperature of −5° C. to 35° C. and a hydroxyl number of 3 to 25 mg KOH/g; and 15 to 40 parts by weight of the melamine resin curing agent (B); 0.3 to 2.0 parts by weight, calculated in terms of an amount of the sulfonic acid compound, of the curing catalyst (C) consisting of at least one selected from the group consisting of a neutralized product between p-toluenesulfonic acid and an amine, and a neutralized product between dodecylbenzene sulfonic acid and an amine; and 1 to 20 parts by weight of the silicone compound (D).

In a resin combination of hydroxyl group-containing polyester resin with a melamine resin curing agent consisting of a mixture of methyl etherified melamine resin and butyl etherified melamine resin in the first invention, or in a resin combination of hydroxyl group-containing polyester resin with a specified melamine resin curing agent having methyl ether group in the second invention, use of the neutralized product between the sulfonic acid compound and amine as the curing catalyst in a large amount makes it possible to form such a film that interior of the film is densely crosslinked, and that pollutants such as oil ink and oil pollutant do not soak into the interior of the film, resulting in that marks due to the pollutant do not remain. Addition of the specified silicone compound reduces a surface tension on the surface of the film, resulting in that pollutants such as oil pollutant and oil ink difficult to remove run away so that adhered pollutants may easily be wiped off with a tissue paper and the like. One of the reasons why stain resistance of the film is improved, may be guessed that orientation of high stain-resistant melamine resin curing agent and silicone compound to the surface of the film may be promoted by elimination of the amine in the curing catalyst and migration thereof to the surface of the film. The silicone compound used has a functional group and reacts with other resin components, so that the silicone compound does not disappear, resulting in making it possible to show high stain resistance for a long period of time.

The coating composition of the present invention is capable of forming a film having high impact resistance and high stain resistance, and is suitable for a top coating composition for use in a coated steel sheet used for the fabrication of utensils needing high stain resistance, for example, range hood, ventilation fan, gas table and the like.

The coating composition of the present invention makes it possible to form a film having excellent properties in fabricating properties, film hardness, and solvent resistance in addition to high impact resistance and stain resistance.

EXAMPLE

The present invention will be explained more in detail by the following Examples and Comparative Examples, in which "part" and "%" are represented by weight.

Preparation of Hydroxyl Group-Containing Polyester Resin

Preparation Example 1

A mixture of 0.4 mole of isophthalic acid, 0.30 mole of phthalic acid, 0.22 mole of adipic acid, 0.66 mole of neopentyl glycol, 0.2 mole of trimethylol propane, 0.05 mole of coconut oil fatty acid, 0.10 mole of 1,6-hexanediol and a polycondensation catalyst was subjected to an esterification reaction at about 220° C. for 5 hours to obtain a polyester resin A-1 having a number average molecular weight of 2,500, a hydroxyl number of 89 mg KOH/g and a transition temperature (Tg) of −5° C.

Examples 1–18 and Comparative Examples 1–9

Respective top coating compositions were prepared according to the formulations shown in the following Tables 1 and 2. KP Color 8620 primer (marketed by Kansai Paint Co., Ltd., trademark, polyester based primer for use in precoat steel sheet,) was coated onto a 0.5 mm thick zinc phosphate-treated zinc-electroplated steel sheet to be a dry film thickness of 5 μm, followed by heat curing for 45 seconds so that an ultimate maximum steel sheet temperature may be 220° C. to obtain a primer-coated steel sheet. Respective top coating compositions obtained as above were coated onto the above primer-coated steel sheet with a bar coater to be a dry film thickness of about 18 μm, followed by heat curing for 60 seconds so that an ultimate maximum steel sheet temperature may be 220° C. to obtain respective top-coated steel sheets. The resulting coated steel sheets were subjected to the following tests.

The test results are shown in Tables 3 and 4. Respective amounts of polyester resin and melamine resin were represented by the weight of solid content, and an amount of the curing catalyst was represented by the weight calculated in terms of respective sulfonic acid compounds in Tables 1 and 2. On preparing coating compositions in Examples and Comparative Examples, titanium white pigment was dispersed, and a cyclohexanone/SWASOL 1,500 (tradename, marketed by Cosmo Oil Co., Ltd., aromatic petroleum based high boiling solvent)=60/40 (weight ratio) mixed solvent was used to control viscosity. On coating, viscosity of the coating composition was controlled to be about 100 seconds (25° C.) by Ford cup #4.

TABLE 1

| | | | Examples | | | | | | | | | Comparative Examples | | | |
|---|---|---|---|---|---|---|---|---|---|---|---|---|---|---|---|
| | | | 1 | 2 | 3 | 4 | 5 | 6 | 7 | 8 | 9 | 1 | 2 | 3 | 4 |
| Polyester Resin | Vylon KS-1640V | (*1) | 80 | 65 | | | 70 | | | | 80 | 80 | 80 | | |
| | Vylon 28D | (*2) | | | | 80 | | | | | | | | 92 | |
| | Vylon GK-250 | (*3) | | | | | | 75 | | | | | | | |
| | Vylon KS-1860V | (*4) | | | 50 | | | | | | | | | | 20 |
| | Vylon KS-1730V | (*5) | | | | | | | 70 | | | | | | |
| | Polyester resin A-1 | | | | | | | | 80 | | | | | | |
| Melamine Resin | Cymel 303 | (*9) | 15 | 30 | 40 | 10 | 20 | 25 | 15 | 15 | 15 | 15 | 15 | 8 | 70 |
| | Super Beckamine J-820-60 | (*10) | 5 | 5 | 10 | 10 | 10 | | | | | 5 | 5 | | 10 |
| | Super Beckamine G-821-60 | (*11) | | | | | | 5 | 5 | 15 | 5 | | | | |
| Silicone Compound | X-22-162C | (*18) | 3 | 4 | 3 | 3 | | | | 3 | | | 0.5 | 3 | 4 |
| | X-22-170B | (*19) | | | | | 10 | | | | | | | | |
| | X-23-371G | (*20) | | | | | | 5 | | | | | | | |
| | X-22-173B | (*21) | | | | | | | 3 | | | | | | |
| | X-22-167B | (*22) | | | | | | | | | 3 | | | | |
| Curing Catalyst | PTSA Neutralized product | (*27) | 0.8 | 1.0 | 1.4 | 0.5 | | 1.0 | 0.4 | 0.8 | | 0.8 | 0.8 | 0.5 | 1.4 |
| | DOBSA Neutralized product | (*28) | | | | | 1.2 | | | | 0.5 | | | | |
| Pigment | Titanium white | | 90 | 90 | 90 | 90 | 90 | 90 | 90 | 90 | 90 | 90 | 90 | 90 | 90 |

TABLE 2

| | | | Examples | | | | | | | | | Comparative Examples | | | |
|---|---|---|---|---|---|---|---|---|---|---|---|---|---|---|---|
| | | | 10 | 11 | 12 | 13 | 14 | 15 | 16 | 17 | 18 | 5 | 6 | 7 | 8 |
| Polyester Resin | KS-1440V | (*6) | 70 | | | | | | 50 | 85 | | 70 | | 70 | 70 | 70 |
| | KS-1730V | (*5) | | 70 | | | | | | | | | 70 | | | |
| | KS-1860V | (*4) | | | 60 | | | | | | 50 | | | | | |
| | KS-1450V | (*7) | | | | 80 | | | | | | | | | | |
| | KS-1640V | (*1) | | | | | 70 | | | | | | | | | |
| | KS-1390V | (*8) | | | | | | 70 | | | 20 | | | | | |
| Melamine Resin | Nikalac MX500 | (*12) | 30 | | 40 | | | | | | 30 | 30 | | 30 | | |
| | Nikalac MX600 | (*13) | | | | 20 | | | 50 | | | | | | | |
| | Nikalac MX95 | (*14) | | | | | 30 | | | | | | | | | |
| | Cymel 303 | (*9) | | 30 | | | | | | 15 | | | 30 | | | |
| | Cymel 327 | (*15) | | | | | | 30 | | | | | | | | |
| | Nikalac MX430 | (*16) | | | | | | | | | | | | | 30 | |
| | U-VAN 20SE | (*17) | | | | | | | | | | | | | | |
| Silicone Compound | KF-102 | (*23) | | | | | 3.0 | | | | | | | | | |
| | K-22-162A | (*24) | | 3.0 | | | | | | 3.0 | | | | | | |
| | KF-6001 | (*25) | | | 2.0 | | | | | | | | | | | |
| | X-22-170B | (*19) | 3.0 | | | 5.0 | | | | 8.0 | 3.0 | | | 3.0 | 3.0 | 3.0 |
| | X-22-167B | (*22) | | | | | | 3.0 | | | | | | | | |
| Curing Catalyst | PTSA Neutralized prodsuct | (*26) | 1.0 | | 1.2 | 0.8 | | | 1.8 | 0.5 | 1.0 | 1.0 | | 0.1 | 1.0 | |
| | DOBSA Neutralized product | (*27) | | 1.0 | | | 1.0 | 1.0 | | | | | 1.0 | | | |
| Pigment | Titanium white | | 90 | 90 | 90 | 90 | 90 | 90 | 90 | 90 | 90 | 90 | 90 | 90 | 90 |

TABLE 3

| | | | Examples | | | | | | | | | Comparative Examples | | | |
|---|---|---|---|---|---|---|---|---|---|---|---|---|---|---|---|
| | | | 1 | 2 | 3 | 4 | 5 | 6 | 7 | 8 | 9 | 1 | 2 | 3 | 4 |
| Test Items | Stain resistance | Test-1 | 0.8 | 0.5 | 0.9 | 0.4 | 0.7 | 0.5 | 0.3 | 0.3 | 0.5 | 0.9 | 1.2 | 2.0 | 1.0 |
| | | Test-2 | ⊚ | ⊚ | ⊚ | ⊚ | ⊚ | ⊚ | ⊚ | ⊚ | ⊚ | x | x | x | ○ |
| | Cissing properties of oil ink | | ⊚ | ⊚ | ⊚ | ⊚ | ⊚ | ⊚ | ⊚ | ⊚ | ⊚ | x | Δ | ○ | ⊚ |
| | Impact resistance | | ⊚ | ⊚ | ⊚ | ⊚ | ⊚ | ⊚ | ⊚ | ⊚ | ⊚ | ⊚ | ⊚ | ⊚ | x |
| | Pencil hardness | | H | H | F | 2H | H | 2H | 2H | H | H | H | H | 2H | F |
| | Fabricating properties | | 2T | 3T | 1T | TT | 3T | 5T | 6T | 2T | 2T | 4T | 4T | 7T | 8T |
| | Solvent resistance | | 50< | 50< | 50< | 50< | 50< | 50< | 50< | 50< | 50< | 50< | 50< | 40 | 20 |

TABLE 4

| | | Examples | | | | | | | | | Comparative Examples | | | | |
|---|---|---|---|---|---|---|---|---|---|---|---|---|---|---|---|
| | | 10 | 11 | 12 | 13 | 14 | 15 | 16 | 17 | 18 | 5 | 6 | 7 | 8 | 9 |
| Test Items | Stain Test-1 | 0.4 | 1.0 | 0.4 | 0.8 | 1.0 | 0.8 | 0.3 | 1.0 | 0.3 | 1.4 | 2.0 | 3.0 | 1.0 | 3.0 |
| | resistance Test-2 | ⊙ | ⊙ | ⊙ | ⊙ | ⊙ | ⊙ | ⊙ | ⊙ | ⊙ | x | x | x | ⊙ | o |
| | Cissing properties of oil ink | ⊙ | ⊙ | ⊙ | ⊙ | ⊙ | ⊙ | ⊙ | ⊙ | ⊙ | x | x | o | o | o |
| | Impact resistance | ⊙ | ⊙ | ⊙ | ⊙ | ⊙ | ⊙ | ⊙ | ⊙ | ⊙ | ⊙ | ⊙ | o | Δ | x |
| | Pencil hardness | H | H | H | H | H | H | H | H | H | H | H | H | H | H |
| | Fabricating properties | 0T | 1T | 0T | 0T | 1T | 1T | 1T | 0T | 0T | 0T | 1T | 1T | 4T | 7T |
| | Solvent resistance | 50< | 50< | 50< | 50< | 50< | 50< | 50< | 50< | 50< | 50< | 50< | 40 | 50< | 50< |

In Tables 1 and 2, (*1)–(*8) represent trade names of polyester resins marketed by Toyobo Co., Ltd., having specifications as shown in Tables 5 and 6 respectively.

TABLE 5

| | Tg (°C.) | Hydroxyl number (mg KOH/g) | Number average molecular weight |
|---|---|---|---|
| Vylon KS-1640V | 20 | 10 | 11,000 |
| Vylon 280 | 72 | 5 | 20,000 |
| Vylon GK-250 | 60 | 12 | 12,000 |
| Vylon KS-1860V | -8 | 17 | 32,000 |
| Vylon KS-1730V | -1 | 14 | 22,000 |

TABLE 6

| | Tg (°C.) | Hydroxyl number (mg KOH/g) | Number average molecular weight |
|---|---|---|---|
| Vylon KS-1440V | 3 | 9 | 19,000 |
| Vylon KS-1730V | same as above | same as above | same as above |
| Vylon KS-1860V | same as above | same as above | same as above |
| Vylon KS-1450V | 6 | 4 | 26,500 |
| Vylon KS-1640V | same as above | same as above | same as above |
| Vylon KS-1390V | 34 | 10 | 17,500 |

(*9) CYMEL 303:

Trade name of lower molecular weight methyl etherified melamine resin having a number average molecular weight of 1,000 or less and containing 60% by weight or more of hexakis (methoxymethyl) melamine, marketed by Mitsui Cyanamid Co., Ltd.

(*10) SUPER BECKAMINE J-820-60:

Trade name of n-butyl etherified melamine resin marketed by Dainippon Ink & Chemicals Inc.

(*11) SUPER BECKAMINE G-821-60:

Trade name of isobutyl etherified melamine resin marketed by Dainippon Ink & Chemicals Inc.

With respect to (*9), (*12)–(*17) in Table 2, NIKALAC MX500, NIKALAC MX600, NIKALAC MX430 are all trade names of methyl ether-n-butyl ether mixed etherified melamine resins marketed by Sanwa Chemical Co., Ltd., NIKALAC MS95 is methyl ether-isobutyl ether mixed etherified melamine resin marketed by Sanwa Chemical Co., Ltd., CYMEL 303 and CYMEL 327 are trade names of methyl etherified melamine resin marketed by Mitsui Cytec Co., Ltd., and U-VAN 20SE is a trade name of butyl etherified melamine resin marketed by Mitsui Toatsu Chemicals Inc. Specifications of above melamine resins are shown in Table 7.

TABLE 7

| | A number on an average of methoxy groups per one of triazine nucleus | Number average molecular weight |
|---|---|---|
| NIKALAC MX500 | 4.4 | About 550 |
| NIKALAC MX600 | 3.5 | About 630 |
| NIKALAC MS95 | 3.5 | About 630 |
| CYMEL 303 | 5.5 | About 500 |
| CYMEL 327 | 3.5 | About 500 |
| MIKALAC MX430 | 2.0 | About 790 |
| U-VAN 20SE | 0 | About 2,000 |

X-22-162C (*18), X-22-170B (*19), X-22-3710 (*20), X-22-173B (*21), X-22-167B (*22), KF-102 (*23), X-22-162A (*24) and KF-6001 (*25) are trade names of the silicone compound represented by the general formula [1] marketed by Shin-Etsu Silicone Co., Ltd. respectively.

(*18) X-22-162C:

One having an organic group having carboxyl groups at both terminals in the general formula [1], a functional group equivalent being about 2,300.

(*19) X-22-170B:

One having an organic group having hydroxyl group at one terminal in the general formula [1], a functional group equivalent being about 2,200.

(*20) X-22-3710:

One having carboxyl group as a functional group in the general formula [1], a functional group equivalent being about 1,250.

(*21) X-22-173B:

One having an organic group having epoxy group at one terminal in the general formula [1], a functional group equivalent being about 2,500.

(*22) X-22-167B: One having an organic group having mercapto groups at both terminals in the general formula [1], a functional group equivalent being about 1,700.

(*23) KF-102:

One having an organic group having alicyclic epoxy groups as the functional group at both terminals in the general formula [1], an functional group equivalent being about 3,600.

(*24) X-22-162A:

One having an organic group having carboxyl groups as the functional group at both terminals in the general formula [1], a functional group equivalent being about 920.

(*25) KF-6001:

One having an organic group having hydroxyl groups as the functional group at both terminals in the general formula [1], a functional group equivalent being about 900.

(*26) PTSA neutralized product:

A neutralized product of p-toluene sulfonic acid with di-n-butyl amine, a neutralization equivalent of the acid with the amine being 1.0.

(*27) DDBSA neutralized product:

A neutralized product of dodecylbenzene sulfonic acid with dimethyloxazolidine, a neutralization equivalent of the acid with the amine being 1.0.

Tests shown in Tables 3 and 4 were carried out according to the following test methods.

Stain Resistance Test-1: At a room temperature of 20° C., a line was drawn on a coated surface with a red oil ink ("Magic ink", large size, red, trademark), followed by leaving to stand for one hour, wiping off with a gause impregnated with n-butanol. A color difference ΔE (a color difference determined by Hunter's color difference formula in accordance with JIS Z8730 6.3.) was measured between a mark of the oil ink after having been wiped off and an area where no oil ink was coated. The smaller is a value of the color difference ΔE, the better.

Stain Resistance Test-2: At a room atemperature of 20° C., a line was drawn on a coated surface with a red oil ink ("Magic ink", large size, red, trademark), followed by leaving to stand for 20 hours, wiping off with a tissue paper ("Scottie tissue", marketed by Kureshia Co., Ltd., trade name). Appearance of the mark of the oil ink after having been wiped off was evaluated as follows.

⊚: No marks are observed.
○: Marks are observed a little.
Δ: Marks remain fairly.
X: Marks remain deeply.

Cissing Properties of Oil Ink: At a room temperature of 20° C., a line was drawn on a coated surface with a red oil ink ("Magic ink", large size, red, trademark) to evaluate a degree of cissing of the oil ink as follows.

⊚: The oil ink runs away like a ball.
○: Cissing takes place all over the area where the oil ink was coated, but not in the form of a ball.
Δ: Cissing party takes place.
X: No cissing takes place.

Impact Resistance: Impact was given onto the coated surface of a coated sheet under the conditions of a falling weight of 500 g, a diameter of a pointed end of a shock mold of ½ inch and a falling height of 50 cm in accordance with Dupont impact tester in JIS K-5400 8.3.2. (1990), followed by adhering an adhesive cellophane tape onto the area where the impact was given, immediately thereafter peeling off the tape to evaluate a degree of peeling off the film as follows.

⊚: No peeling off is observed on the coated surface.
X: Peeling off is observed on the coated surface.

Pencil Hardness: A pencil scratch test by hand scratch method in accordance with JIS K5400 8.4.2 was carried out to evaluate according to resulting mars.

Fabricating Properties: Respective coated metal sheets were bent at an angle of 180° with a coated film surface facing outside at a room temperature of 20° C. to examine if no crackings develop on a bent portion any more. Evaluation was made by a T number, in which no crackings develop on the bent portion any more. The above T number is defined such that 0T means a case where respective coated metal sheets are bent at an angle of 180° without putting anything inside the bent portion, 1T means a case where respective coated metal sheets are bent so that one sheet of piece may be put inside the bent portion, 2T similarly means a case where two sheets of pieces may be put inside the bent portion, and 3T similarly means a case where three sheets of pieces may be put inside the bent portion.

Solvent Resistance: At a room temperature of 20° C., a gauze impregnated with methyl ethyl ketone was piled up on the surface of a coated metal sheet to be subjected to a reciprocating motion between a distance of about 5 cm under a compressed pressure of about one kg/cm². A number of the reciprocating motion repeated by the time when a primer film appears was recorded. Cases, in which the primer film does not appear by a repeating number of 50, are represented as 50<.

What is claimed is:

1. A coating composition containing 100 parts by weight of a resin composition consisting of 30 to 90 parts by weight of (A) a hydroxyl group-containing polyester resin and 10 to 70 parts by weight of (B) a melamine resin curing agent consisting of a mixture of methyl etherified melamine resin with butyl etherified melamine resin; 0.2 to 3.0 parts by weight, calculated in terms of an amount of a sulfonic acid compound, of (C) a curing catalyst consisting of a neutralized product between the sulfonic acid compound and an amine; and 1 to 20 parts by weight of (D) a silicone compound represented by the following general formula:

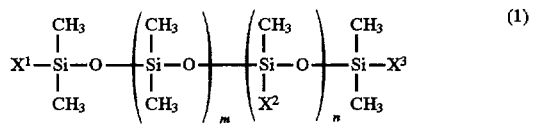

where $X^1$, $X^2$ and $X^3$ represent methyl group or a $C_1$–$C_8$ organic group having at least one functional group selected from the group consisting of hydroxyl group, carboxyl group, epoxy group and mercapto group, provided at least one of $X^1$, $X^2$ and $X^3$ is a $C_1$–$C_8$ organic group having at least one functional group selected from the group consisting of hydroxyl group, carboxyl group, epoxy group and mercapto group, m is an integer of 10 to 300, n is an integer of 0 to 290, a total of m and n is in the range of 10 to 300, an orientation order of repeating

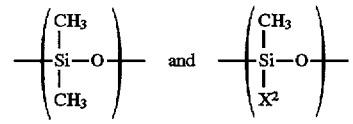

may be in the form of a random orientation or block orientation.

2. A coating composition containing 100 parts by weight of a resin composition consisting of 30 to 90 parts by weight of (A) a hydroxyl group-containing polyester resin and 10 to 70 parts by weight of (B) a melamine resin curing agent consisting of a melamine resin having three or more on an average of a methyl etherified methylol group per one of triazine nucleus and having a number average molecular weight of 1,000 or less; 0.2 to 3.0 parts by weight, calculated in terms of an amount of a sulfonic acid compound, of (C) a curing catalyst consisting of a neutralized product between the sulfonic acid compound and an amine; and 1 to 20 parts by weight of (D) a silicone compound represented by the following general formula:

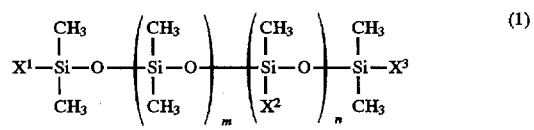

where $X^1$, $X^2$ and $X^3$ represent methyl group or a $C_1$–$C_8$ organic group having at least one functional group selected from the group consisting of hydroxyl group, carboxyl group, epoxy group and mercapto group, provided at least one of $X^1$, $X^2$ and $X^3$ is a $C_1$–$C_8$ organic group having at least one functional group selected from the group consisting of hydroxyl group, carboxyl group, epoxy group and mercapto group, m is an integer of 10 to 300, n is an integer of 0 to 290, a total of m and n is in the range of 10 to 300, an orientation order of repeating units:

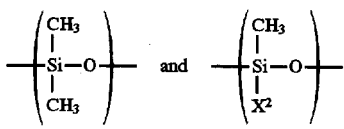

may be in the form of a random orientation or block orientation.

3. A coating composition as claimed in claim 1, wherein the polyester resin (A) has a number average molecular weight of 1,000 to 35,000, a glass transition temperature of −10° C. to 80° C. and a hydroxyl number of 3 to 160 mg KOH/g.

4. A coating composition as claimed in claim 1, wherein the methyl etherified melamine resin in the melamine resin curing agent (B) is a methyl etherified melamine resin having three or more on an average of methyl etherified methylol group per one of triazine nucleus and having a number average molecular weight of 1,000 or less.

5. A coating composition as claimed in claim 1, wherein the melamine resin curing agent (B) has a methyl etherified melamine resin/butyl etherified melamine resin solid content weight ratio of 95/5 to 25/75.

6. A coating composition as claimed in claim 1, wherein the curing catalyst (C) is at least one selected from the group consisting of a neutralized product between p-toluenesulfonic acid and an amine, and a neutralized product between dodecylbenzene sulfonic acid and an amine.

7. A coating composition as claimed in claim 1, wherein $X^1$, $X^2$ and $X^3$ in the silicone compound (D) represented by the general formula [1] are methyl group or $C_{1-8}$ hydrocarbon group having hydroxyl group or carboxyl group, provided at least one of $X^1$, $X^2$ and $X^3$ is $C_{1-8}$ hydrocarbon group having hydroxyl group or carboxyl group.

8. A coating composition as claimed in claim 1, wherein an equivalent of the functional group in the silicone compound (D) is in the range of 300 to 5,000.

9. A coating composition as claimed in claim 4, wherein said coating composition contains 100 parts by weight of a resin composition consisting of 60 to 85 parts by weight of the hydroxyl group-containing polyester resin (A) having a number average molecular weight of 4,000 to 30,000, a glass transition temperature of −5° C. to 35° C. and a hydroxyl number of 3 to 25 mg KOH/g; and 15 to 40 parts by weight of the melamine resin curing agent (B) having a methyl etherified melamine resin/butyl etherified melamine resin solid content weight ratio of 85/15 to 30/70; 0.3 to 2.0 parts by weight, calculated in terms of an amount of the sulfonic acid compound, of the curing catalyst (C) consisting of at least one selected from the group consisting of a neutralized product between p-toluenesulfonic acid and an amine, and a neutralized product between dodecylbenzene sulfonic acid and an amine; and 1 to 20 parts by weight of the silicone compound (D).

10. A coating composition as claimed in claim 2, wherein said coating composition contains 100 parts by weight of a resin composition consisting of 60 to 85 parts by weight of the hydroxyl group-containing polyester resin (A) having a number average molecular weight of 4,000 to 30,000, a glass transition temperature of −5° C. to 35° C. and a hydroxyl number of 3 to 25 mg KOH/g; and 15 to 40 parts by weight of the melamine resin curing agent (B); 0.3 to 2.0 parts by weight, calculated in terms of an amount of the sulfonic acid compound, of the curing catalyst (C) consisting of at least one selected from the group consisting of a neutralized product between p-toluenesulfonic acid and an amine, and a neutralized product between dodecylbenzene sulfonic acid and an amine; and 1 to 20 parts by weight of the silicone compound (D).

11. A highly stain-resistant coated metal sheet prepared by forming a cured film from a coating composition as claimed in claim 1 directly or through a primer coat onto a metal sheet.

12. The coating composition as claimed in claim 2 wherein the polyester resin (A) has a number average molecular weight of 1,000 to 35,000, a glass transition temperature of −10° C. to 80° C. and a hydroxyl number of 3 to 160 mg KOH/g.

13. The coating composition as claimed in claim 2 wherein the curing catalyst (C) is at least one selected from the group consisting of a neutralized product between p-toluenesulfonic acid and an amine, and a neutralized product between dodecylbenzene sulfonic acid and an amine.

14. The coating composition as claimed in claim 2 wherein $X^1$, $X^2$ and $X^3$ in the silicone compound (D) represented by the general formula [1] are methyl group or $C_{1-8}$ hydrocarbon group having hydroxyl group or carboxyl group, provided at least one of $X^1$, $X^2$ and $X^3$ is $C_{1-8}$ hydrocarbon group having hydroxyl group or carboxyl group.

15. The coating composition as claimed in claim 2 wherein an equivalent of the functional group in the silicone compound (D) is in the range of 300 to 5,000.

16. The highly stain-resistant coated metal sheet prepared by forming a cured film from a coating composition as claimed in claim 2 directly or through a primer coat onto a metal sheet.

17. A highly stain-resistant coated metal sheet prepared by forming a cured film from a coating composition as claimed in claim 9 directly or through a primer coat onto a metal sheet.

18. A highly stain-resistant coated metal sheet prepared by forming a cured film from a coating composition as claimed in claim 10 directly or through a primer coat onto a metal sheet.

* * * * *